Aug. 2, 1949. E. A. JOHNSON 2,477,751
APPARATUS FOR SUSPENDED CATALYST OPERATIONS
Filed June 29, 1945 2 Sheets-Sheet 1
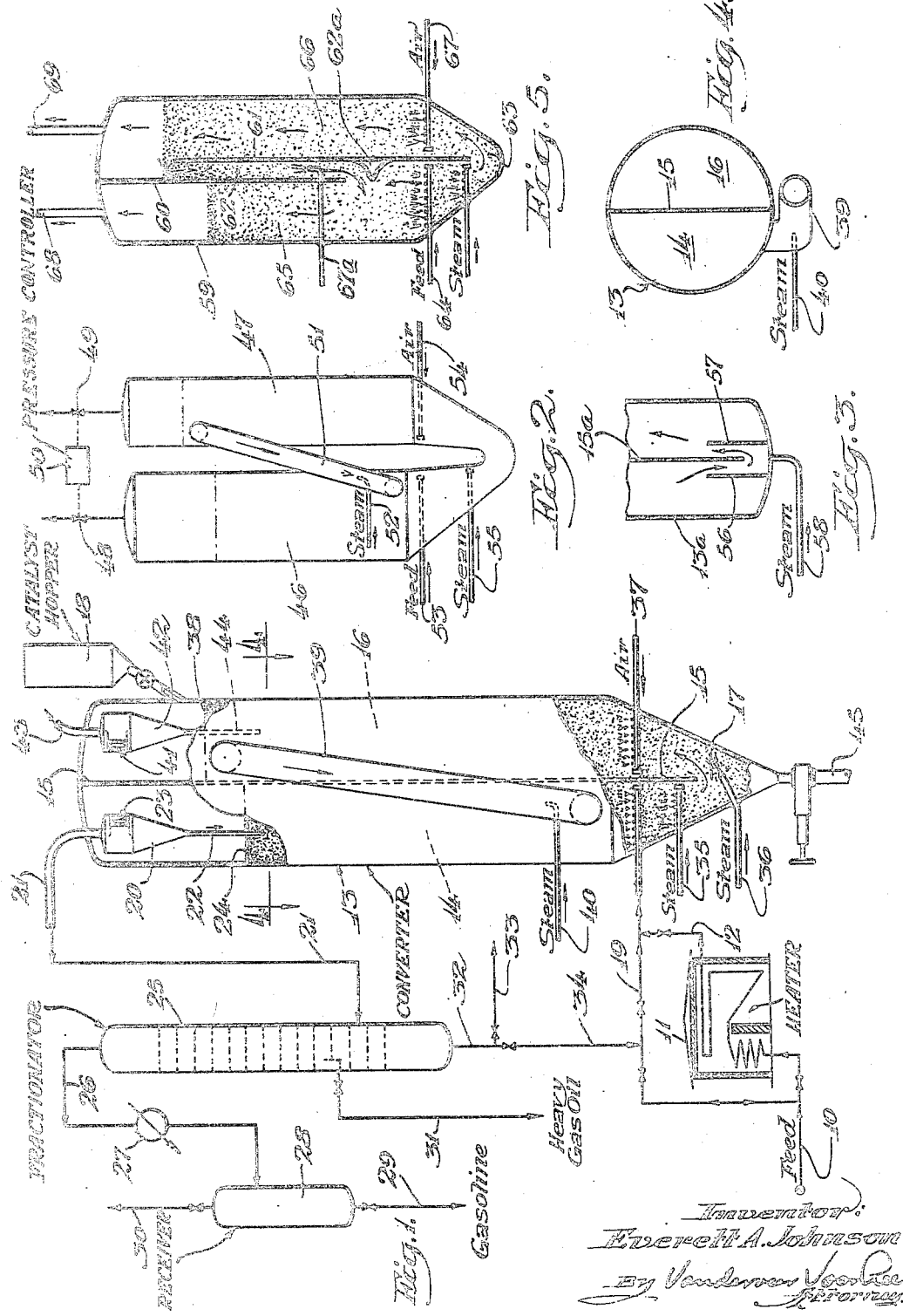

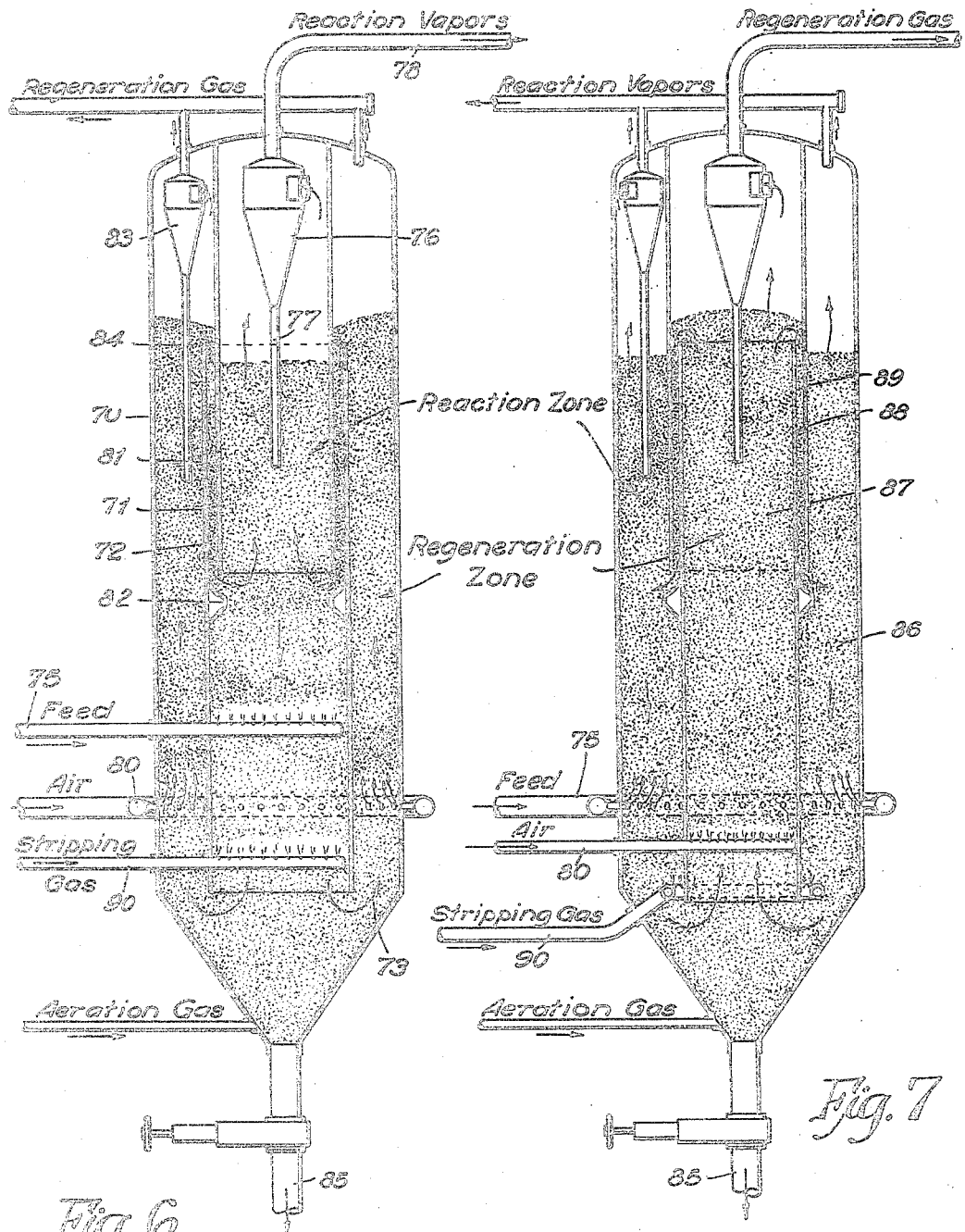

Patented Aug. 2, 1949

2,477,751

UNITED STATES PATENT OFFICE 2,477,751

APPARATUS FOR SUSPENDED CATALYST OPERATIONS

Everett A. Johnson, Park Ridge, Ill., assignor to Standard Oil Company, Chicago, Ill., a corporation of Indiana Application June 29, 1945, Serial No. 602,240

5 Claims. (Cl. 23—288)

This invention relates to the contacting of finely divided solids with gasiform fluids and more particularly it relates to a catalytic conversion system wherein finely divided catalyst effects a conversion while suspended in a gasiform fluid. This invention further relates to the conversion of hydrocarbon oils by the action of catalyst and more particularly to the cracking of heavy hydrocarbons to produce gasoline of high antiknock grade. Still more particularly the invention relates to a system in which the catalyst is continuously regenerated in a regeneration zone and recycled to the reaction zone where is contacts further quantities of the hydrocarbon.

This application is a continuation-in-part of my copending applications S. N. 427,947, filed January 23, 1942, and S. N. 428,913, filed January 30, 1942, the latter having issued as U. S. 2,464,812. The application may also be considered as a continuation-in-part of my prior applications, S. N. 392,846, filed May 10, 1941, and S. N. 392,847, filed May 10, 1941, with respect to which applications reference may also be made to the copending application of Page, S. N. 376,763, filed January 31, 1941; Scheineman S. N. 392,848, filed May 10, 1941; Scheineman S. N. 400,956, filed June 3, 1941; Gunness S. N. 400,958, filed July 3, 1941, and Scheineman S. N. 440,566, filed April 27, 1942.

An object of this invention is to provide a system for the transfer of the finely divided solids between contacting zones. A further object is to minimize the power required for the recycling of catalyst between a conversion zone and a regeneration zone. Enormous quantities of catalyst must thus be recirculated in systems of this type and an object is to minimize the distances through which the solids must be conveyed, to minimize the frictional resistance to flow, to minimize solids deterioration because of handling and to minimize the erosion on equipment which is caused by catalyst flow.

Another object of the invention is to provide an improved system for utilizing at least a part of the heat of regeneration for supplying at least a part of the heat of conversion. Another object of the invention is to effect simultaneous regeneration of catalyst in a regeneration zone adjacent or contiguous to the reaction zone, thereby simplifying the problem of transferring the catalyst in the system. An additional object of the invention is to provide an apparatus for conversion of the so-called dirty residual stocks difficult to process by the catalytic conversion systems of the prior art. Still another object of the invention is to provide a system for effecting the circulation of catalyst between contacting zones by controlling the density of the catalyst and by maintaining a pseudo-hydrostatic balance of pressures between the contacting zones. Other objects will be apparent as the detailed description of the invention proceeds.

To attain these and other objects, I provide a system for maintaining a fluidized powdered catalyst mass throughout the conversion, regeneration and transfer system. Catalyst flow from the reaction zone to the regeneration zone, and thence back to the reaction zone, is effected simply by controlling the vertical gas or vapor velocities in said zones while maintaining the necessary catalyst inventories. The vertical gasiform fluid velocities determine the density of suspended catalyst in each zone and also determine the gas lift effect therein. The recycling of catalyst in this system is effected by controlling the pressures and catalyst densities in various parts of the system and this in turn is accomplished by regulating gasiform fluid velocities in various parts of the system. On one side of the system there is a gas lift effect and the net movement of the catalyst is upwards while on the other side of the system the gravity head of the catalyst is greater than the gas lift effect so that the net movement is downward. By the control of the gas lift and gravity effects in various parts of the system the desired direction and rate of catalyst flow can be obtained.

The invention is illustrated by a drawing in which Figure 1 is a flow diagram of my process employing a unitary regenerator-reactor. Figure 2 is a modified form of regenerator-reactor in which separate vessels are employed. Figure 3 is a detail of a seal which may be employed to conduct the catalyst between the reactor and the regenerator shown in Figure 1. Figure 4 is a cross section on line 4—4 through the converter of Figure 1, Figure 5 is another modified form of converter, and Figures 6 and 7 are variations of the apparatus of Figure 5.

My system is adapted to the conversion of hydrocarbons generally including the cracking of heavy oils to gasoline and reforming of light fractions, heavy naphtha, etc. into gasoline of high knock rating. The apparatus is generally applicable to the cracking of heavy oils, gas oil, and residual stocks which may be charged to the reactor in the form of vapor or directly in the form of liquid sprayed into the reactor in direct contact with the catalyst. When charging feed stock directly to the reactor, I avoid any undesirable thermal cracking occurring in the step commonly employed in the prior art processes of preheating feed to conversion temperature in the absence of catalyst.

The catalyst which I employ is generally of a siliceous type such as the activated clays, acid-activated montmorillonite clay, fuller's earth, etc. Various synthetic catalysts may be employed such as the metal oxides, generally an intimate mixture of two or more metal oxides such as silica, alumina, magnesia, zirconia, beryllia, thoria, etc. Aluminum fluoride may be admixed with the foregoing. A composition comprising from 2 to 40 per cent of magnesia and/or alumina, with active silica, e. g. silica gel, making up the balance is an effective cracking catalyst. For reforming operations, I prefer to use magnesia or alumina promoted with oxides of the group V and VI metals such as vanadia, chromia, or molybdena.

The catalyst should be in the form of a powder or fine granules which may be suspended in the hydrocarbon vapors undergoing treatment. A particle size of 10 mesh to 400 mesh is satisfactory and usually I prefer a catalyst having a particle size within the range of about 100 to 300 mesh.

Referring to Figure 1, the feed stock, for example a Mid-Continent gas oil of 35° A. P. I. gravity, may be charged by line 10 to heater 11 and thence by transfer line 12 to the converter 13, more specifically to the reaction zone 14 within the converter. The converter 13 is divided by a baffle plate 15 into a vertical reaction zone 14 and a regeneration zone 16, the division plate 15 completely separating the two zones except for an area or passage 17 at the bottom through which catalyst flows from one zone to the other. The catalyst may be charged to the system in suspension in the feed stock or through catalyst supply hopper 18.

The temperature of the reactor 14 may be suitably within the range of about 800 to 1100° F., generally about 925 to 1000° F. and the feed stock may be charged to the reactor superheated to the temperature of operation. However, since excess heat is available for the reactor from the regeneration of catalyst, as will be hereinafter explained, I may charge the liquid feed oil directly to the reactor without vaporization or with only a moderate preheating. By-pass line 19 around furnace 11 is provided for this purpose.

The catalyst within reactor 14 is preferably maintained in a dense suspension by regulating the velocity of the vapors passing upwardly therethrough. The catalyst concentration in this suspension may be about 5 to 30 pounds of catalyst per cubic foot more or less, depending on the catalyst and the type of operation employed. In general, the density of the catalyst suspension in the reactor is within the range of 10 to 15 pounds per cubic foot. The term "suspension" is employed to indicate a dispersion of catalyst particles in the gas or vapor wherein the dispersion system has the free-flowing properties characterizing a fluid. The hydrocarbon vapors are brought into intimate contact with the catalyst and sufficient space and catalyst are provided in reactor 14 to give the desired time of contact for conversion of the oil into gasoline. The amount of oil so converted in a single pass is usually about 10 to 60 per cent, a conversion of 25 to 50 per cent being typical. The time of contact between the hydrocarbon vapors and catalyst is a function of the relative weight velocity, i. e. the weight of oil per hour per unit weight of catalyst in the reactor. A relative weight velocity of about 2 to 20 may be used, usually about 4 to 10 being satisfactory.

The conversion products pass upwardly through the reaction zone, leaving a deposit of carbonaceous matter on the catalyst. The vaporous products leave the reactor through the catalyst separator 20 which may be a cyclone separator discharging vapor substantially free of catalyst by line 21 and returning recovered catalyst to the reaction zone by line 22. The space 23 at the top of the reactor may form a settling zone in which most of the catalyst is settled by gravity from the up-flowing vapors and the catalyst may form a definite interface as indicated by line 24.

The product vapors are conducted by line 21 to fractionator 25 where a heavy fraction (or fractions) is separated and thence by line 26 to condenser 27 and receiver 28 from which gasoline products may be withdrawn by line 29 while fixed gases are discarded by line 30. The heavy gas oil fraction may be withdrawn from the column 25 by trapout line 31, thereby providing a limited amount of a still heavier fraction to be withdrawn from the bottom of the fractionator 25 by line 32. This fraction may contain some very finely divided catalyst carried over from the reactor in the product vapors. If desired, all products heavier than gasoline may be withdrawn by line 32. The material withdrawn may be discarded from the system by line 33 or recycled by line 34 to the reactor, either through line 19 or through heater 11.

To prevent excessive loss of catalyst activity, a portion of the catalyst which settles to the bottom of reactor 14 flows continuously or intermittently through the passage 17 below the baffle 15 into the regenerator 16 where it is contacted with air or other oxygenous gas which chemically removes the carbonaceous matter from the catalyst. A stream of steam or inert gas may be introduced by line 35 placed below the feed inlet from transfer line 12. This steam serves to displace or strip from the catalyst any hydrocarbon vapors associated therewith and also assists in maintaining the catalyst in aerated, free-flowing condition. The flow of catalyst into the regenerator 16 may be facilitated by injecting additional steam through jet 36 as indicated. As the catalyst enters the regenerator 16, it is brought in contact with a current of air or other oxygenous gas introduced by line 37. The catalyst is maintained in suspension in the regenerator 16 and builds up a level which may be substantially above the level of catalyst in the reactor 14, the interface between the catalyst and vapor space at the top of 16 being indicated by 38. In normal operation the temperature in the regenerator 16 will be above the temperature in reactor 14 owing to the exothermic heat from the regeneration reaction in which carbon is burned from the surface of the catalyst. The increase in regenerator temperature in my process, however, is small because the relatively high rate of catalyst recycle tends to effect temperature equalization throughout the converter. The regenerator temperature may also be controlled by cooling in various ways, as for example, by means of cooling coils or by withdrawing a portion of the catalyst to a cooler and returning the cooled catalyst to the regenerator. Regenerator temperatures should ordinarily not exceed 1000 to 1200° F. with most catalysts, otherwise the catalyst activity becomes impaired.

A dust 39 is provided for carrying catalyst from the upper level in 16 to a low point in 14. The density of the catalyst-gas mixture in 16 will usually be maintained at a lower value than the density of the catalyst-gas mixture in the reactor 14, although this is not an essential condition and may also be reversed. As a result, the catalyst in 16 rises to a sufficiently high level to flow into the downcomer or standpipe 39. Within 39 the density of the catalyst-gas mixture still further increases owing to the lack of turbulence. However, the density within 39 may be controlled, if desired, by introducing steam or other gas at 40. The steam so introduced serves to sweep regeneration products from the catalyst back into the regenerator thereby avoiding oxidation of the hydrocarbon products in 14.

Typical density conditions are the following:

|  | Pounds per cubic foot |
|---|---|
| Reactor 14 | 20–25 |
| Regenerator 16 | 15–20 |
| Standpipe 39 | 25–50 |

The spent regeneration gases now substantially free of oxygen are separated from catalyst in quiescent zone 41 and thence flow through cyclone 42 into discharge line 43 which eliminates the waste gases from the system. Recovered catalyst from cyclone 42 is returned to the regenerator by dip leg 44 which, if desired, may return regenerated catalyst directly to the standpipe 39. When desired, spent or partially exhausted catalyst may be withdrawn from the system by line 45 and replaced by new catalyst.

Instead of being a single vessel, the reactor and regenerator of Figure 1 may be two separate vessels as shown in Figure 2, a short connection at the bottom providing for crossflow of catalyst from one vessel to the other with a minimum of resistance. Reactor 46 may be of larger cross section than 47, if desired, thereby providing for a lower vapor velocity and a higher catalyst density, with the same rates of vapor and gas flow. However, this is a matter of design, and will depend on the amount of regeneration gas and other factors. If desired, some regeneration gas may be recycled to increase the flow through the regenerator and reduce density.

It is desirable that resistance to flow imposed on the catalyst in passing from one vessel to the other be very small in order to obtain high catalyst circulation rates with only a slight pressure differential. To facilitate catalyst circulation, it is also important to employ substantially the same pressure within the reactor and the regenerator, and this may be accomplished by automatic control of outlet valves 48 and 49 in reaction product and regeneration gas lines, controller 50 being provided for the purpose. When employing separate vessels for the reactor and the regenerator, it is desirable that they be close together and parallel in order to avoid as far as possible the resistance to catalyst flow which would result from horizontal conduits. Transfer of catalyst from the regenerator to the reactor without loss of heat is also facilitated by propinquity.

Although the drawing is not in scale, it should be apparent that the downcomer or standpipe 51 may be of sufficient cross-sectional area to permit settling and increase in density of the catalyst in this relatively quiescent zone, without loss of its fluid character, however. Accordingly, the column of catalyst contained in 51 will be enough denser than the catalyst in 46 to provide the desired pressure for circulation of catalyst. Circulation may be controlled by regulating the introduction of steam or other inert gas at 52. In general, zones 46 and 47 are turbulent zones of relatively lower catalyst density than transfer zone 51.

In Figure 2 feed stock is introduced substantially as described in Figure 1 through line 53. Regeneration gas is charged through line 54 and additional stripping steam may be introduced through line 55.

Although the suspension of catalyst in gases containing from ten to thirty pounds of catalyst per cubic foot is free-flowing and behaves much as a liquid, it effectively resists the diffusion and flow of vapors when in a quiescent zone. Advantage is taken of this fact in the present invention to prevent exchange of vapors between the reactor and the regenerator. The catalyst in the base of converter 13 (Figure 1) and below charge line 19 offers sufficient resistance to seal the lower end of baffle 15. The passage 17, however, is of sufficient diameter to permit the catalyst to flow freely from one zone to the other.

When operating with catalyst suspensions of low density, it may be desirable to employ a trap or seal at the bottom of division plate 15 and one such seal is shown diagrammatically in Figure 3. In that case the converter 13a may be provided with a substantially flat bottom to which is fastened a pair of baffles 56 and 57 forming a trough about the lower edge of baffle 15a. Catalyst accumulates in this trough with sufficient density to seal the trough against vapor transfer around baffle 15a. The catalyst trapped in this trough, however, is kept fluid by the introduction of steam or other aerating gas by line 58 when necessary. Baffles 56 and 57 may be inclined, if desired, to facilitate the flow of catalyst therethrough.

In the modification of my apparatus shown in Figure 5, converter 59, which may be a vertical cylindrical tower, is divided by vertical baffles 60 and 61 in the manner shown to provide therebetween a channel 62 through which catalyst may flow from the upper part of one section of the converter to the lower part of the other section. Deflector 62a serves to prevent hydrocarbon vapors entering the channel 62. A passage 63 is provided at the bottom of baffle 61 to permit circulation of catalyst between the two sections.

In operation, hydrocarbon charge is introduced by line 64 and dispersed in the lower part of the reaction zone 65 where it is contacted with suspended catalyst. Catalyst which falls to the bottom of the reaction zone 65 flows through opening 63 into the regeneration zone 66, where it is regenerated by contact with a stream of air introduced through line 67. The suspension of catalyst in 66 rises above the baffle 61 and flows downwardly through the channel 62. Inert stripping or sealing gas, steam, etc. may be introduced into the channel 62 via line 67a if desired, and aeration gas may be introduced into channel 63. The flow of catalyst through 62 into 65 may be controlled by a suitable damper if desired. The reaction products are withdrawn from 65 through vapor line 68 while products of regeneration are withdrawn from 66 through outlet 69. Other forms of apparatus may be employed using inclined baffle plates 60 and 61 or other arrangements embodying the main feature of a downward channel conducting catalyst from the upper part of one zone of the reactor-regenerator to the lower part of the other zone, where the catalyst is dispersed, settled and recycled. The baffle 60 may extend to a point below vapor inlet 64 if desired, providing that the lower end is at a point of turbulence from which the catalyst will be rapidly distributed through the reactor.

The baffles 60 and 61 may be curved to allow for expansion stresses and they may also take the form of cylinders, as shown in Figure 6 and Figure 7, one cylinder extending from the top to a low point in the converter and the other from a point near the bottom to an elevated point within or around the other. Referring to Figure 6, chamber 70 contains two cylindrical baffles 71 and 72, preferably concentric with the chamber. Baffle 71 forms a gas-tight junction with the upper of chamber 70 while baffle 72 approaches near the bottom of the chamber, leaving annular space 73 for circulation of catalyst. Feed stock is introduced by line 75 and distributed across throughout the cross-sectional area enclosed by baffle 72. Chamber 70 is filled with fluidized solid catalyst to a level as indicated. Vapors rise from the inlet pipe and spreader 75, flowing upwardly through the reaction vessel enclosed within baffles 71 and 72 and pass out of the apparatus through cyclone separator 76 where catalyst carried from the fluidized catalyst body is largely separated and recovered, returning by dip leg 77. The reaction product is passed by line 78 to fractionating apparatus not shown. The vapor velocities within the reaction zone just described are sufficient to maintain the catalyst in dense fluid suspension with a high degree of turbulence, rapidly moving the catalyst from top to bottom of said zone.

As the fluid body of catalyst within the reaction zone moves downwardly, it is subjected to the action of a stripping gas, e. g. steam introduced by line 79 and volatilizable hydrocarbons adsorbed on the catalyst are largely removed. The catalyst thence passes under the lower edge of baffle 72 as indicated by the arrow, thence flowing upwardly through the annular space lying outside baffle 72. This space is the regeneration zone where the catalyst is subjected to the oxidizing action of air or other oxygen-containing gas admitted through oxygen manifold 80. A rapid reaction ensues and a high degree of turbulence, keeping the fluidized catalyst well mixed and in substantially uniform suspension. After this catalyst body passes upwardly through the regeneration zone, the carbonaceous deposits contained on it are removed by combustion, leaving the catalyst in an active condition for further hydrocarbon processing. The catalyst rises in the regeneration zone, the pressure acting on it causing it to flow being imposed by the difference in density of the catalyst in the regeneration and reaction zones. A higher density in the reaction zone causes the catalyst to flow generally downward therein and upward through the annular regeneration zone. The density in turn is controlled largely by regulating the amount of vapors introduced into the catalyst in the reaction zone and the amount of air introduced into the regeneration zone.

The catalyst in the regeneration zone builds up to a level as indicated exceeding the top of the cylindrical baffle 72. It then spills over and flows by gravity downward through the annular space 81. In this space the density of the catalyst increases owing to reduced turbulence and the increase is helpful to assist in the transfer of catalyst through the reaction and regeneration zones.

Deflector ring 82 placed at the lower end of baffle 71 serves to direct the catalyst from the downcoming annulus 81 into the reaction zone and prevent gases rising into the downcoming zone 81.

Spent regeneration gas is withdrawn from the space above the catalyst in the regeneration zone through cyclone separators 83, the catalyst recovered thereby being returned to the catalyst body by dip legs 84. Whenever it is necessary to withdraw catalyst from the system it may be done by outlet line 85 and fresh catalyst may be added to the system by suspending it in the hydrocarbon vapor feed introduced through line 75 or by suspending it in the air introduced through line 80.

Figure 7 requires no detailed description inasmuch as the arrangement is the same as that in Figure 6 excepting that in this case the reaction zone 86 is shown surrounding the regeneration zone 87 and the catalyst is maintained at a higher level in the inner chamber than in the outer annular chamber by maintaining the density of the catalyst in the inner chamber below that of the density in the outer chamber. As a result the catalyst overflows the upper end of cylindrical baffle 88 and passes downwardly through channel 89 into reaction zone 86. Stripper gas is introduced by line 90 at a low point in the reaction zone, the catalyst returning around the lower end of baffle plate 88 into the regeneration zone where it again flows upwardly in the cycle. In the reaction zone, turbulence carries the catalyst throughout the zone from top to bottom and maintains it in a relatively uniform condition of activity.

As indicated hereinabove, one of the advantages of my invention is the feasible use of high catalyst-to-oil feed ratios. Whereas the prior art employed catalyst ratios of the order of one part of catalyst per part of oil to four parts of catalyst per part of oil by weight, I may successfully employ catalyst ratios of 5 to 1 up to 50 to 1 and generally of the order of 10 to 1 up to 25 to 1. By using high catalyst ratios of this order, I find it possible to use catalysts of much lower activity and yet obtain high conversion rates of the order of 35 to 60 per cent of gasoline per pass. Furthermore, as mentioned hereinabove, I can avoid the necessity of cooling the regenerator for removal of exothermic regeneration heat, inasmuch as the rapid circulation of catalyst from the exothermic regeneration to the endothermic reaction zones suffices to prevent undue rise of temperature in the regenerator. The regeneration temperatures are, accordingly, not much higher than reaction temperatures and generally I may operate with regeneration temperatures of the order of 25 to 100° or 150° F. above reaction temperatures, while entirely avoiding overheated local areas with consequent catalyst deterioration. The life of the catalyst in my process is, therefore, much longer than that in conventional catalytic conversion processes and catalysts of greater thermal sensitivity may be employed than in conventional processes.

The pressure used in my conversion apparatus is preferably low, for example atmospheric to 25 to 50 pounds per square inch, generally about 5 to 20 pounds per square inch. In catalytic reforming of naphtha, higher pressures are advantageous, e. g. 100 to 400 pounds per square inch, especially when hydrogen is present. The amount of hydrogen may be about 1 to 5 volumes per volume of naphtha treated and in this operation I prefer to use catalysts of the type of molybdenum or chromium oxide supported on active alumina.

Although I have described my invention by means of specific applications thereof, I intend that it be construed as broadly as the following claims indicate.

I claim:

1. A unitary system for treating a gaseous stream with solids of small particle size and for regenerating and recycling said solids which system comprises an outer vessel, an upper internal baffle separating the upper part of said vessel into a first chamber and a second chamber, a second baffle substantially parallel to the lower portion of said first baffle and spaced therefrom, said second baffle separating said first chamber from said second chamber in the lower part of said vessel, the space between said baffles forming a conduit for the flow of solids from the first chamber to the second chamber, means for returning solids from said second chamber to said first chamber, means for introducing gaseous material at a low point in said first chamber whereby solids may be suspended therein as a dense turbulent phase on one side of said conduit and may overflow from said first chamber through the space between said baffles to said second chamber, means for introducing a stripping gas into said conduit, means for introducing a second gaseous stream at low level in said second chamber whereby a suspended dense solids phase may be maintained in said second chamber on the other side of said conduit, means for removing a gaseous stream from the upper part of said first chamber and separate means for removing a gaseous stream from the upper part of the second chamber.

2. An apparatus for alternately contacting a body of finely divided solids with two gasiform fluids wherein said finely divided solids are maintained in dense suspension in said gasiform fluids, said apparatus comprising a contacting vessel, a substantially vertical wall dividing said vessel into two contacting chambers, a port through said wall at the bottom thereof connecting said chambers, means for introducing gases at a low point in each of said chambers, means for separately withdrawing treated gases from a high point within each of said chambers, means for introducing finely divided solids into said vessel, said dividing wall consisting essentially of two parallel baffles, one of said baffles depending from the top of said vessel to an intermediate point therein, the second baffle being laterally displaced from said first baffle and extending from a point above the bottom of said first baffle to said port, the space between said baffles providing a vertical channel for said solids, an opening at the top of said channel communicating with one of said chambers, and an opening at the bottom of said channel communicating with the other of said chambers.

3. An apparatus for conducting gas phase reactions in the presence of a fluidized, finely divided solid maintained in free-flowing, dense phase suspension which comprises a vertical cylindrical tower, a substantially concentric cylindrical baffle within said tower extending downward from the top of said tower to an intermediate point, a second cylindrical baffle extending upward from a point near the bottom of said tower to a point near the top of said tower, said second baffle surrounding said first baffle and spaced therefrom sufficient to form a downcomer channel for fluidized solids between said baffles, said baffles coacting to divide said tower into an inner contacting chamber and an outer annular contacting chamber, an opening at the top of said downcomer channel connecting it at the top with one chamber and another opening at the bottom connecting it with the other chamber, an inlet for gases at a low point in said inner contacting chamber, an inlet for other gases at a low point in said outer contacting chamber, separate outlets for gases in the tops of said inner and outer contacting chambers, and a port in said second baffle near the bottom thereof to provide a passage for free flow of fluidized solids between said chambers.

4. The apparatus of claim 3 wherein an inlet for stripper gas is provided at a low point in one of said contacting chambers below the said gas inlet therein.

5. The apparatus of claim 3 wherein a deflector is provided at the lower extremity of said downcomer channel to prevent upflowing gases in said inner contacting chamber gaining access thereto.

EVERETT A. JOHNSON.

REFERENCES CITED

The following references are of record in the file of this patent:

UNITED STATES PATENTS

| Number | Name | Date |
|---|---|---|
| 2,378,342 | Voorhees et al. | June 12, 1945 |
| 2,400,176 | Thiele | May 14, 1946 |
| 2,428,872 | Gunness | Oct. 14, 1947 |